United States Patent [19]

Leung et al.

[11] Patent Number: 5,543,701
[45] Date of Patent: Aug. 6, 1996

[54] ELECTRICAL STORAGE CELL POLARIZATION CONTROLLER

[75] Inventors: Chiu F. Leung, East Hanover; Thomas D. O'Sullivan, Summit, both of N.J.

[73] Assignee: Bell Communications Research, Inc., Livingston, N.J.

[21] Appl. No.: 149,251

[22] Filed: Nov. 9, 1993

[51] Int. Cl.$^6$ .................................................. H02J 7/00
[52] U.S. Cl. ................................................ 320/4; 320/39
[58] Field of Search .............................. 320/4, 5, 18, 21, 320/37, 38, 39, 40; 429/61, 92

[56] References Cited

U.S. PATENT DOCUMENTS

| | | |
|---|---|---|
| 2,670,395 | 2/1954 | Audubert et al. ................... 320/4 X |
| 4,358,892 | 11/1982 | Turillon et al. . |
| 4,415,638 | 11/1983 | Meighan et al. ................... 429/22 J |
| 4,614,905 | 9/1986 | Peterson et al. ................... 320/39 X |
| 4,931,367 | 6/1990 | Brecht et al. ................... 320/4 X |
| 4,935,688 | 6/1990 | Mistry et al. ................... 320/4 |

*Primary Examiner*—Peter S. Wong
*Assistant Examiner*—Edward Tso
*Attorney, Agent, or Firm*—Leonard Charles Suchyta; Lionel N. White

[57] ABSTRACT

In order to extend the useful life of electrical storage battery cells under float voltage charge it is advisable to maintain the polarization of the positive plates of the cell relative to a reference electrode in the cell at a predetermined level. This invention provides a sensing and controller circuit which drains minute amounts of current from the positive cell plates when the polarization rises above the desired level and thereby prevents plate corrosion and loss of electrolyte. The present invention may be combined with a circuit for increasing cell polarization levels to provide a system for maintaining battery cells at optimum polarization levels over extended float charging periods.

10 Claims, 2 Drawing Sheets

ELECTRICAL STORAGE CELL POLARIZATION CONTROLLER

BACKGROUND OF THE INVENTION

In order to maintain continuity of operation during periods of primary power source failure, many electrical systems, such as the public telephone network, utilize electrolytic batteries as interim sources of operating power. Depending upon the support voltage required, a number of battery cells are arranged in a series-connected string and the string is placed in the system circuit in parallel with the primary rectifier power source. During normal operation of the system, the rectifier source supplies operating power to the system and provides a continual "float" voltage to the cells to maintain the charge that will be needed to support the system in the event of failure of the primary power source.

The common lead-acid battery cell ($PbO_2/Pb/H_2SO_4$) widely used in support power supplies has a useful life of a number of years; however, this term is limited by the corrosion occurring, particularly at the positive cell electrode, due to the oxidizing conditions resulting from the repeated application of charging current to the cell. While this effect is exaggerated during periods of recharging after substantial support usage, even the low-level float voltage contributes to significant oxidation of the metallic lead grid at the positive electrode with resulting buildup of oxides that will ultimately cause physical damage to the cell.

Attempts have been made previously to minimize the deleterious effects of charging current on battery cells, but few have resolved the problem of damaging oxide generation. For example, in U.S. Pat. No. 4,614,905 a shunting circuit is used to divert charging current from the more fully-charged cells of a series string to prevent direct damage from overcharging, but even this extensive control does not affect the float or trickle charge to cells exhibiting a nominal full charge, and the oxidation of the positive electrode persists. Mechanical approaches, such as suggested in U.S. Pat. No. 4,358,892, have also been proposed, but have resulted in significant cost increases while only temporarily delaying the deep oxidation of the positive electrode occurring upon the application of recharging currents and under continuing oxidizing conditions resulting from persistent float voltage.

In an earlier invention by one of the present Applicants, viz., that disclosed in U.S. Pat. No. 4,935,688, the description of which is incorporated herein by reference, oxidation and corrosion of the plates of electrolytic battery cells, particularly the positive electrode plates of lead-acid storage cells, was effectively minimized during float charge by the application of a minute additional current to the positive cell electrode in order to bias toward a predetermined level the polarization potential of those plates in the cell electrolyte. The invention also provided a means for monitoring the polarization potential and metering the appropriate current input to the positive electrode to obtain the desired polarization level.

According to that latter patent description, the optimum positive plate potential for a lead-acid ($PbO_2/Pb/H_2SO_4$) battery cell under the usual float charge voltage of about 2.2 V was indicated to be in the range of 60±20 millivolts, depending upon electrolyte specific gravity and purity of electrode materials. The plate potential was monitored relative to a reference electrode having a composition similar to the positive electrode, i.e. $PbO_2/PbSO_4$, which was immersed in the cell electrolyte. This monitoring was effected by means of a low-power, limited current potentiostat-type system which responded to the polarization level by metering to the positive electrode a current of up to about 50 milliamps per kiloamp-hour of cell rating depending upon the extent to which the polarization was below the desired optimum. Under the influence of this adjusting current input, the polarization of the cell plates stabilized within the desired 40–80 millivolt range over the period of a few months and remained at this steady state with little grid metal oxidation.

SUMMARY OF THE INVENTION

As a result of studying the operation of the earlier polarization controller system, it has now been discovered that the variations in battery cell composition which occur among manufacturers may cause certain cells in a series string to have an initially high plate polarization or to respond more vigorously to adjusting current input and thereby to increase in polarization potential over time to a level which exceeds the projected optimum. Indeed, such cells may attain plate polarization levels which have a deleterious effect on cell electrolyte and ultimately lead to loss of cell life.

The present invention alleviates this problem by providing a polarization potential monitoring and control system which senses cell polarization excesses and responds by draining from the positive cell electrode a current of up to about 50 milliamps per kiloamp-hour of cell rating, depending upon the extent of excess. In this manner, the system maintains within the range of an optimum 60 ±20 millivolts the polarization potential of a lead-acid battery cell under the usual float charge voltage of about 2.2 V.

In a broader application, the capabilities of the invention may be combined with those of the earlier system to provide a universal cell plate polarization control which will bias the polarization potential in the direction and to the extent necessary to maintain the level in an optimum range.

BRIEF DESCRIPTION OF THE DRAWING

The present invention will be described with reference to the accompanying drawing of which.

DESCRIPTION OF THE INVENTION

Figure 1:
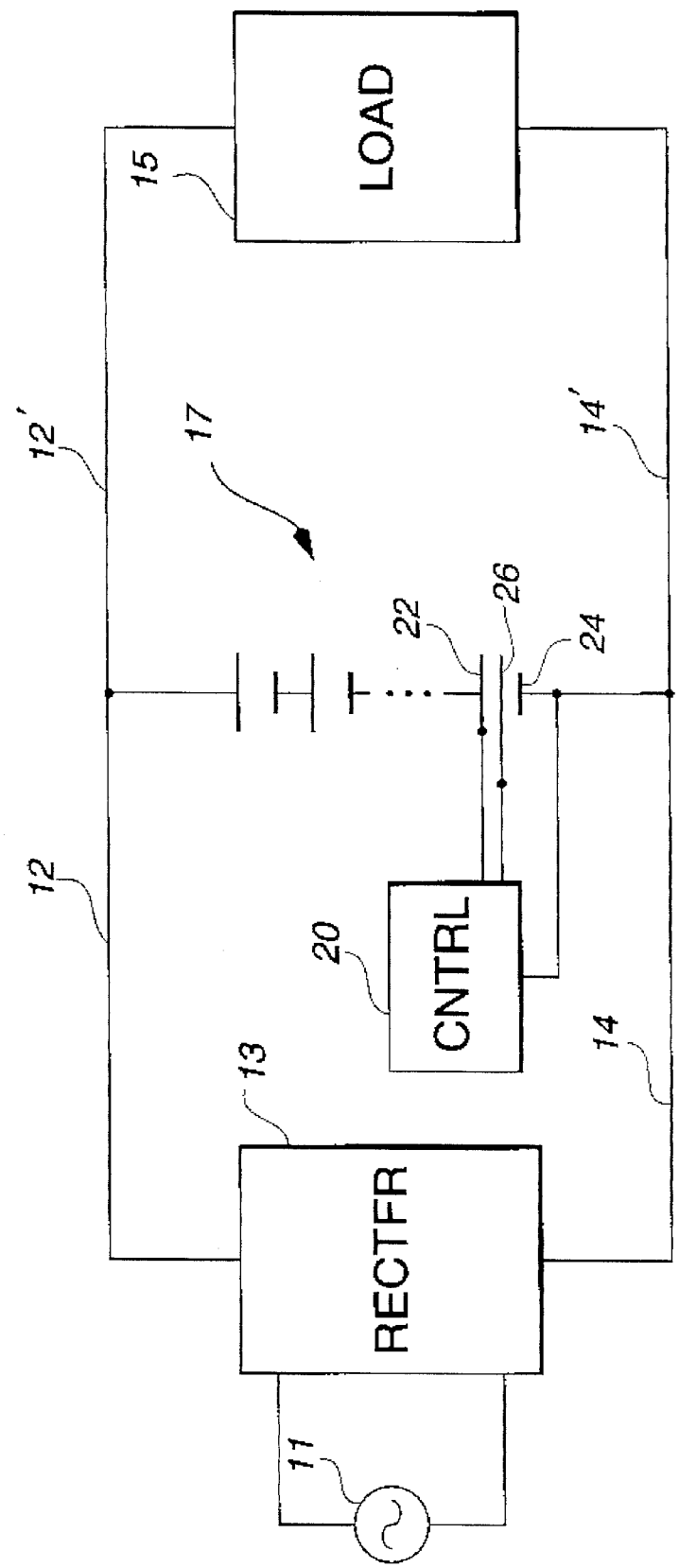
FIG. 1 is a representation of a typical electrical storage cell string circuit incorporating a polarization controller system according to the present invention.

A common arrangement for providing continuous direct current power to a load 15, such as a telephone system, is generally shown in FIG. 1. A source 11 of alternating current provides the input to a rectifier 13 from which the direct current is furnished to load 15 by means of the circuit comprising conductors 12, 12', 14', and 14. Connected between the conductors in parallel with load 15 is a series string 17 of a number of electrolytic storage cells which will ensure the continuity of operating power to the load via conductors 12' and 14' in the event of failure of the rectifier power system.

In the typical telephone system, battery string 17 consists of twenty-four nominal 2 volt (2.06 VDC) lead-acid cells to yield a reserve power source of about 47 volts. To maintain the desired charge on the cells of string 17, rectifier 13 provides an optimum of about 52 volts which represents a "float", or trickle charge, voltage of about 2.2 volts per cell. This float voltage supports the cell charge by preventing sulfating of the electrodes and promoting oxidation at the surface of the positive electrode. Over time, however, this oxidation not only maintains the desired $PbO_2$ composition of the positive electrode surface, but also leads to a deeper formation of destructive oxide at the metallic Pb of the positive electrode grid.

As described in above-noted U.S. Pat. No. 4,935,688, this undesirable deep oxidation of the positive cell electrode is more prevalent as the polarization potential at this electrode surface, itself apparently influenced by the condition of the surface composition, the state of the electrolyte, temperature, and other factors, approaches the lower end of its range. It was observed further that the oxide formations at higher polarization levels are of smaller particle size and more closely associated so as to form an effective barrier against the penetration of oxygen to the structural metallic Pb of the positive electrode grid. The inventors appreciated, however, that excessive levels of polarization would likely result in the generation of increasingly high quantities of oxygen; therefore, a preferred range of polarization at the positive cell electrode was selected to be about 60 ±20 millivolts with respect to a reference electrode having a chemical composition similar to that of the positive electrode.

This level of polarization potential was achieved and maintained by means of the described controller circuit which applied to the positive electrode additional scaled amounts of current up to about 50 mA/kA-hr. With increasing polarization this adjusting current was gradually reduced by the controller over time to a point where none was further required when the optimum polarization level had been achieved. Thereafter, any normal drifting of the polarization potential toward undesired lower levels was remedied by occasional application of adjusting current by the controller circuit.

Battery cell manufacturers have apparently recognized the advantages of higher cell plate polarization potential and often intentionally formulate their cells to effect such higher polarization as a means of extending the initial cycling life of their products. As a result of this functional variant, battery plants of mixed cell type are becoming more prevalent and a greater range of polarization across strings, often including excessive levels, is being observed. Operation of the previously satisfactory current-adding polarization controller system has thus resulted in occasional and unpredictable instances of significantly excessive plate polarization and undesirable oxygen generation and electrolyte degradation.

In order to obviate this problem and maintain an optimum polarization potential at the positive electrode with a greater variety of battery cells, we have improved upon the previous monitoring polarization controller system which is described in U.S. Pat. No. 4,935,688. Our new system, shown in FIG. 1 as being generally similar in its application to the prior system, also comprises a reference electrode 26 and a controller 20; however, it provides the additional facility for reducing excessive polarization potential to maintain an optimum range. Although, for clarity, only one such arrangement is shown in FIG. 1, in normal implementation of the polarization controller system, each cell of a battery string 17 would have associated with it a reference electrode 26 and a polarization controller 20. The controller 20, in each instance, is connected in circuit with the positive cell electrode 22 and the reference electrode 26 which is immersed in the cell electrolyte along with electrode 22 and the negative cell electrode 24. The reference electrode 26 has generally the same $PbO_2$ chemical composition as positive electrode 22, and may be of any convenient shape and size. We have found the rod-like element of a typical tubular battery electrode to be particularly useful, since it may be readily accommodated through the usual battery vent opening.

Figure 2:
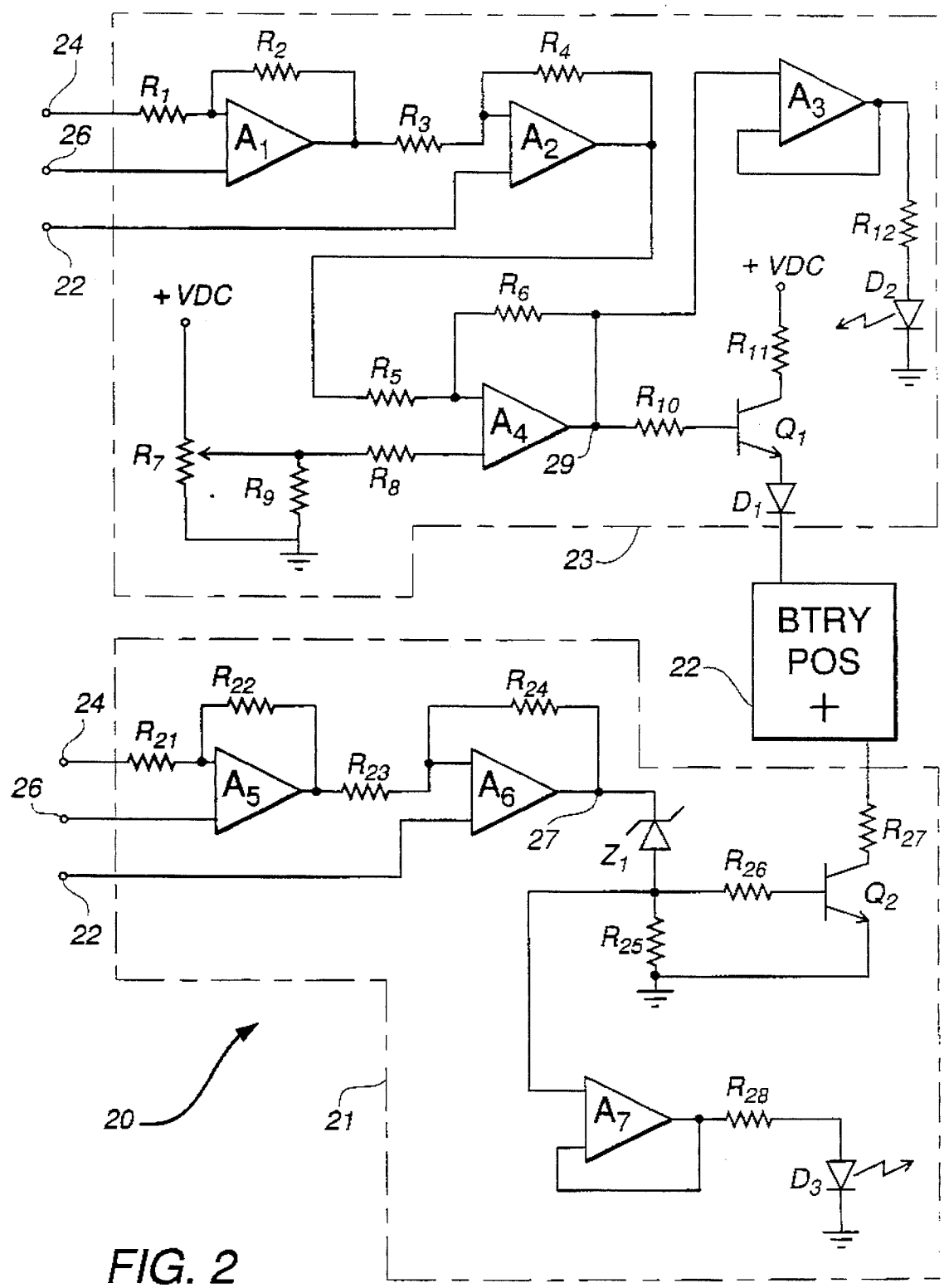
FIG. 2 is a schematic diagram of a preferred embodiment of the polarization controller of the invention.

The improved controller circuit, a preferred embodiment of which is more specifically depicted in FIG. 2, continually monitors the polarization potential between reference electrode 26 and positive battery electrode 22 and, when this potential is above optimum range, drains from the positive battery cell terminal an appropriate amount of current to bias the polarization toward a desired level in the preferred range of about 60 millivolts. As shown in FIG. 2, the circuitry of controller 20 includes a section 21 which provides this capability of depressing excessive plate polarization, and may additionally include a section 23 which serves to raise undesirably low polarization potentials in the manner of the prior controller system.

The embodiment of the present invention shown in schematic detail in FIG. 2 utilizes common resistor circuit elements selected to exhibit functional values shown in Table 1 and could normally include typical associated capacitor elements (not shown). The circuits also include amplifiers

TABLE 1

| Resistor - Ohms | |
| --- | --- |
| $R_1$ - 100K | $R_{11}$ - 80 |
| $R_2$ - 1.0K | $R_{12}$ - 325 |
| $R_3$ - 1.0K | $R_{21}$ - 60K |
| $R_4$ - 100K | $R_{22}$ - 1.0K |
| $R_5$ - 10K | $R_{23}$ - 1.0K |
| $R_6$ - 13K | $R_{24}$ - 60K |
| $R_7$ - 0–10K | $R_{25}$ - 600 |
| $R_8$ - 10K | $R_{26}$ - 7.6K |
| $R_9$ - 13K | $R_{27}$ - 40 |
| $R_{10}$ - 13K | $R_{28}$ - 325 |

$A_1$–$A_7$, each of which may be one element of low power quad operational amplifiers, such as comprise the LM324 devices available from National Semiconductor Corporation. In the preferred arrangement, the high input impedance differential amplifier pair $A_1$, $A_2$ provide a gain of about 100, while the pair $A_5$, $A_6$ provide a lower gain of about 60 to yield a non-saturated output. The circuit further includes general purpose rectifier diode $D_1$, such as marketed by Motorola, Inc. as the 1N4004 device, as well as general purpose transistors $Q_1$, $Q_2$, such as the 2N2222A product, also from Motorola. Optional light-emitting diodes (LEDs) $D_2$, $D_3$ of differing colors may be utilized to visually monitor the operation of the controller.

In use according to the present invention, section 21 of controller 20 monitors, by means of op-amps $A_5$, $A_6$, the difference in polarization at the positive cell electrode 22 and the reference electrode 26. In the event that the polarization potential exceeds 60 mV, the threshold established by 3.3 volt zener diode $Z_1$, a proportional voltage develops across $R_{25}$ and bias current determined by $R_{26}$ controls transistor $Q_2$ to drain current from positive battery terminal 22 and thereby depolarize the cell. The extent of depolarizing current flow is proportional to the voltage developed across $R_{25}$. The voltage threshold established by diode $Z_1$, i.e., that corresponding to a polarization potential of 60 mV, is about 4.6 $V_{out}$ measured at junction 27. The relationship of this control voltage to cell polarization potential in the present exemplary embodiment is shown in Table 2 which indicates also the level of depolarization (–) current flow. The maximum range of about 50 ma drain programmed for this embodiment serves well for battery cells rated up to about one kiloamp-hour (kA-hr).

The function of increasing a cell polarization potential in the manner described in U.S. Pat. No. 4,935,688 may be provided in a companion section 23 of a single controller circuit device 20. As depicted in FIG. 2, the output voltage (at junction 29) from amplifier $A_4$ controls transistor $Q_1$ which proportionally meters polarization (+) current to positive battery terminal 22 from a +10 VDC source at the rates shown in Table 2. Variable resistor $R_7$ is used as a means of calibrating the system and in the present embodiment is set at about 3.5K ohms.

TABLE 2

| Polarization Voltage mV | Control Voltage $V_{out}$ | Polarization Current ma/kA-hr |
|---|---|---|
| Depolarization: | | |
| 100 | 7.0 | −52.5 |
| 90 | 6.4 | −43.5 |
| 80 | 5.8 | −34.5 |
| 70 | 5.2 | −25.5 |
| 60 | 4.6 | −16.5 |
| 50 | 4.0 | 0 |
| Polarization: | | |
| 50 | 6.3 | 0 |
| 40 | 5.1 | +10 |
| 30 | 4.1 | +20 |
| 20 | 3.1 | +30 |
| 10 | 2.1 | +40 |
| 0 | 0.0 | +50 |

The polarization state of the various positive electrodes in a battery string may be monitored by means of the noted optional LEDs $D_2$, $D_3$ which are respectively illuminated to varying intensity depending upon the level of polarization or depolarization in process. Persistent illumination of an LED at a particular cell provides a useful diagnostic indication that some malfunction of the cell is preventing optimum charging.

Under normal operation, the reference electrode of a polarization controller system itself requires recharging at various intervals depending on temperature, chemical purity, and drain rate. A minimum interval would be about four to six months, while an interval of several years should be achievable in order to maintain the proper condition of its own PbO$_2$ surface. Such reconditioning may readily be effected by simply shorting this reference electrode to the positive cell electrode, or otherwise charging the electrode through a current-limiting resistor, and allowing it to remain on open circuit for about 10 to 15 hours before beginning the control cycle once again. This periodic charging of the reference electrode may be accomplished manually, or simple additional circuitry, not shown here, may be included in the controller arrangement to effect such cycling automatically.

The present invention, described here with respect to its currently preferred embodiment, thus provides a method and apparatus for maintaining for extended periods of time the effective operating condition of electrolytic battery cells by preventing the destructive oxidation of the structural electrode metal and degeneration of electrolyte. It is anticipated that other embodiments of the invention will be apparent from the foregoing description to those of ordinary skill in the art, and such embodiments are likewise to be considered within the scope of the invention as set out in the appended claims.

What is claimed is:

1. A method of extending the useful life of an electrical storage cell which comprises biasing the polarization potential of the positive cell electrode, when compared to a reference electrode in contact with the electrolyte of said cell and having a similar chemical composition as that of said positive electrode, toward the range of about 40 to 80 millivolts characterized in that said polarization potential biasing is effected by draining from said positive electrode an amount of current up to about 50 milliamps per kiloamp-hour of battery rating in generally direct proportion to polarization potentials above about 60 millivolts.

2. A method according to claim 1 wherein said cell is a lead-acid battery cell in circuit with a source of float charge voltage.

3. A method according to claim 2 which comprises:

a) measuring the polarization of the positive electrode of said cell with respect to a reference electrode in contact with the electrolyte of said cell and having a similar chemical composition as that of said positive electrode; and b) draining from said positive electrode an amount of current up to about 50 milliamps per kiloamp-hour of battery rating in generally direct proportion to polarizations above about 60 millivolts.

4. The method according to claim 3 wherein said float charge voltage is about 2.2 VDC and said draining of current from said positive electrode is substantially in accordance with the following table:

| Polarization Voltage mV | Polarization Current ma/kA-hr |
|---|---|
| 100 | −52.5 |
| 90 | −43.5 |
| 80 | −34.5 |
| 70 | −25.5 |
| 60 | −16.5 |
| 50 | 0. |

5. Apparatus for extending the useful life of an electrical storage battery cell in circuit with a source of float charge voltage which comprises a reference electrode in contact with the electrolyte of said cell and having a similar chemical composition as that of the positive electrode of said cell, and controller means for biasing the polarization of said positive electrode with respect to said reference electrode toward the range of about 40 to 80 millivolts characterized in that said controller means comprises:

a) means for comparing the polarization potential of said positive electrode with that of said reference electrode; and b) means responsive to the magnitude of said potential for draining from said positive electrode an amount of current up to about 50 milliamps per kiloamp-hour of battery rating in generally direct proportion to polarizations above about 60 millivolts.

6. Apparatus according to claim 5 characterized in that said means for draining said current comprises:

a) gate means for metering current flow from said positive electrode; and b) means responsive to said polarization potential for controlling said gate means.

7. Apparatus according to claim 6 wherein said cell is a lead-acid battery cell and said float charge voltage is about 2.2 VDC characterized in that said gate controlling means is arranged to effect said drain of current from said positive electrode substantially in accordance with the following table:

| Polarization Voltage mV | Polarization Current ma/kA-hr |
|---|---|
| 100 | −52.5 |
| 90 | −43.5 |
| 80 | −34.5 |
| 70 | −25.5 |
| 60 | −16.5 |
| 50 | 0. |

8. Apparatus according to claim 6 characterized in that said controller means further comprises means responsive to the magnitude of said potential for applying to said positive electrode an amount of current up to about 50 milliamps per kiloamp-hour of battery rating in generally inverse proportion to polarizations below about 60 millivolts.

9. Apparatus according to claim 8 characterized in that said means for applying said current comprises:
   a) second gate means for metering current flow to said positive electrode; and
   b) second means responsive to said polarization potential for controlling said second gate means.

10. Apparatus according to claim 9 wherein said cell is a lead-acid battery cell and said float charge voltage is about 2.2 VDC characterized in that said gate controlling means are arranged to respectively effect said current flow at said positive electrode substantially in accordance with the following table:

| Polarization Voltage mV | Polarization Current ma/kA-hr |
|---|---|
| 100 | −52.5 |
| 90 | −43.5 |
| 80 | −34.5 |
| 70 | −25.5 |
| 60 | −16.5 |
| 50 | 0 |
| 40 | +10 |
| 30 | +20 |
| 20 | +30 |
| 10 | +40 |
| 0 | +50. |

\* \* \* \* \*